US012706032B2

(12) United States Patent
Kim et al.

(10) Patent No.: US 12,706,032 B2
(45) Date of Patent: Aug. 11, 2026

(54) PIXEL CIRCUIT, DISPLAY DEVICE INCLUDING THE PIXEL CIRCUIT, AND ELECTRONIC DEVICE INCLUDING THE DISPLAY DEVICE

(71) Applicant: Samsung Display Co., LTD., Yongin-si (KR)

(72) Inventors: Yeonkyung Kim, Yongin-si (KR); Kyung-Bae Kim, Yongin-si (KR); Dongwoo Kim, Yongin-si (KR); Yonghee Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/256,484

(22) Filed: Jul. 1, 2025

(65) Prior Publication Data

US 2026/0112307 A1 Apr. 23, 2026

(30) Foreign Application Priority Data

Oct. 21, 2024 (KR) ........................ 10-2024-0143757

(51) Int. Cl.
*G09G 3/32* (2016.01)

(52) U.S. Cl.
CPC ......... *G09G 3/32* (2013.01); *G09G 2300/043* (2013.01); *G09G 2300/0465* (2013.01); *G09G 2300/0819* (2013.01); *G09G 2310/08* (2013.01)

(58) Field of Classification Search
CPC ............... G09G 3/32; G09G 2300/043; G09G 2300/0465; G09G 2300/0819; G09G 2310/08
See application file for complete search history.

(56) References Cited

U.S. PATENT DOCUMENTS

| | | | | |
|---|---|---|---|---|
| 2021/0248961 A1* | 8/2021 | Yang | .................... | G09G 3/3266 |
| 2022/0335872 A1* | 10/2022 | Zhang | .................. | G09G 3/3233 |
| 2022/0415254 A1* | 12/2022 | Jeon | ..................... | G09G 3/3233 |
| 2023/0146078 A1* | 5/2023 | Huang | ................. | G09G 3/3266 345/55 |
| 2025/0265994 A1* | 8/2025 | Kim | ..................... | G09G 3/2007 |

* cited by examiner

*Primary Examiner* — Premal R Patel
(74) *Attorney, Agent, or Firm* — CANTOR COLBURN LLP

(57) ABSTRACT

A pixel circuit includes first to fifth transistors, a first capacitor, a second capacitor, and a light emitting element. The pixel circuit may provide a high PPI and have a relatively small area or footprint. The pixel circuit may compensate a threshold voltage of the first transistor, a dispersion of a mobility of the first transistor, and a threshold voltage of the third transistor. The pixel circuit may prevent an anode initialization issue due to a body effect from occurring. The pixel circuit may provide an increase in a data swing range. A feedback path formed in the pixel circuit may prevent a deterioration of the light emitting element.

20 Claims, 8 Drawing Sheets

PIXEL CIRCUIT, DISPLAY DEVICE INCLUDING THE PIXEL CIRCUIT, AND ELECTRONIC DEVICE INCLUDING THE DISPLAY DEVICE

This application claims priority to Korean Patent Application No. 10-2024-0143757, filed on Oct. 21, 2024, and all the benefits accruing therefrom under 35 U.S.C. § 119, the content of which in its entirety is herein incorporated by reference.

BACKGROUND

1. Field

Embodiments supported by aspects of the present disclosure relate to a pixel circuit, a display device including the pixel circuit, and an electronic device including the display device. More particularly, embodiments of the present disclosure relate to a pixel circuit applicable to a high-resolution display device, a display device including the pixel circuit, and an electronic device including the display device.

2. Description of the Related Art

In general, a display device may include a display panel and a display panel driver. The display panel may include gate lines, data lines, and pixels. The display panel driver may include a gate driver for providing a gate signal to the gate lines, a data driver for providing a data voltage to the data lines, and a driving controller for controlling the gate driver and the data driver.

Recently, a display device for providing a virtual reality (VR) or augmented reality (AR) has been highlighted. For this purpose, a display devices having a small area and a high PPI (Pixels Per Inch) may be desired. In this case, since a pitch or area occupied by pixel circuits of the display device is narrowed, there may be a restriction on the number of transistors constituting the pixel circuit and the signals applied to the pixel circuits.

In some aspects, as the PPI increases, a data swing range of a data voltage may decrease. In other words, as the PPI increases, a luminance accuracy according to a change in the data voltage may relatively decrease.

SUMMARY

Embodiments supported by aspects of the present disclosure provide a pixel circuit for providing a high PPI and improving a data swing range while having a relatively small area or footprint.

Embodiments supported by aspects of the present disclosure provide a display device including the pixel circuit.

Embodiments supported by aspects of the present disclosure provide an electronic device including the display device.

In an embodiment of a pixel circuit according to the present inventive concept, the pixel circuit includes a first transistor including a gate electrode connected to a first node, a first electrode which receives a first power supply voltage, and a second electrode connected to a second node, a second transistor including a gate electrode which receives a data write gate signal, a first electrode connected to a data line via which a data voltage is transmitted, and a second electrode connected to the first node, a third transistor including a gate electrode connected to the second node, a first electrode connected to the second node, and a second electrode connected to a third node, a fourth transistor including a gate electrode which receives an emission signal, a first electrode connected to the third node, and a second electrode connected to a fourth node, a fifth transistor including a gate electrode which receives an anode initialization gate signal, a first electrode which receives an initialization voltage, and a second electrode connected to the fourth node, a first capacitor including a first electrode which receives the first power supply voltage and a second electrode connected to the first node, and a light emitting element including an anode connected to the fourth node and a cathode which receives a second power supply voltage.

In an embodiment, the pixel circuit may further include a second capacitor including a first electrode connected to the first node and a second electrode connected to the third node.

In an embodiment, the pixel circuit may further a second capacitor including a first electrode connected to the first node and a second electrode connected to the fourth node.

In an embodiment, the first transistor, the second transistor, the third transistor, the fourth transistor, and the fifth transistor may be NMOS transistors.

In an embodiment, in a first duration, the data write gate signal may have a high level, the emission signal may have a low level, and the anode initialization gate signal may have the high level.

In an embodiment, in the first duration, the first transistor, the second transistor, the third transistor, and the fifth transistor may be turned on, and the fourth transistor may be turned off.

In an embodiment, in a second duration after the first duration, the data write gate signal may have the low level, the emission signal may have the high level, and the anode initialization gate signal may have the high level.

In an embodiment, in the second duration, the first transistor, the third transistor, the fourth transistor, and the fifth transistor may be turned on, and the second transistor may be turned off.

In an embodiment, in a third duration after the second duration, the data write gate signal may have the low level, the emission signal may have the high level, and the anode initialization gate signal may have the low level.

In an embodiment, in the third duration, the first transistor, the third transistor, and the fourth transistor may be turned on, and the second transistor and the fifth transistor may be turned off.

In an embodiment of a display device according to the present inventive concept, the display device includes a display panel including a pixel circuit, a data driver which provides a data voltage to the pixel circuit, a gate driver which provides a gate signal to the pixel circuit, and a driving controller which controls the data driver and the gate driver. The pixel circuit includes a first transistor including a gate electrode connected to a first node, a first electrode which receives a first power supply voltage, and a second electrode connected to a second node, a second transistor including a gate electrode which receives a data write gate signal, a first electrode connected to a data line via which a data voltage is transmitted, and a second electrode connected to the first node, a third transistor including a gate electrode connected to the second node, a first electrode connected to the second node, and a second electrode connected to a third node, a fourth transistor including a gate electrode which receives an emission signal, a first electrode connected to the third node, and a second electrode connected to a fourth node, a fifth transistor including a gate electrode which receives an anode initialization gate signal, a first electrode which receives an initialization voltage, and a second electrode connected to the fourth node, a first capacitor including a first electrode which receives the first power supply voltage and a second electrode connected to the first node, and a light emitting element including an anode connected to the fourth node and a cathode which receives a second power supply voltage.

In an embodiment, the pixel circuit may further include a second capacitor including a first electrode connected to the first node and a second electrode connected to the third node.

In an embodiment, the pixel circuit may further a second capacitor including a first electrode connected to the first node and a second electrode connected to the fourth node.

In an embodiment, the first transistor, the second transistor, the third transistor, the fourth transistor, and the fifth transistor may be NMOS transistors.

In an embodiment, in a first duration, the data write gate signal may have a high level, the emission signal may have a low level, and the anode initialization gate signal may have the high level.

In an embodiment, in the first duration, the first transistor, the second transistor, the third transistor, and the fifth transistor may be turned on, and the fourth transistor may be turned off.

In an embodiment, in a second duration after the first duration, the data write gate signal may have the low level, the emission signal may have the high level, and the anode initialization gate signal may have the high level.

In an embodiment, in the second duration, the first transistor, the third transistor, the fourth transistor, and the fifth transistor may be turned on, and the second transistor may be turned off.

In an embodiment, in a third duration after the second duration, the data write gate signal may have the low level, the emission signal may have the high level, and the anode initialization gate signal may have the low level.

In an embodiment of an electronic device according to the present inventive concept, the electronic device includes a display panel including a pixel circuit, a data driver which provides a data voltage to the pixel circuit, a gate driver which provides a gate signal to the pixel circuit, a driving controller which controls the data driver and the gate driver, and a processor which controls the driving controller. The pixel circuit includes a first transistor including a gate electrode connected to a first node, a first electrode which receives a first power supply voltage, and a second electrode connected to a second node, a second transistor including a gate electrode which receives a data write gate signal, a first electrode connected to a data line via which a data voltage is transmitted, and a second electrode connected to the first node, a third transistor including a gate electrode connected to the second node, a first electrode connected to the second node, and a second electrode connected to a third node, a fourth transistor including a gate electrode which receives an emission signal, a first electrode connected to the third node, and a second electrode connected to a fourth node, a fifth transistor including a gate electrode which receives an anode initialization gate signal, a first electrode which receives an initialization voltage, and a second electrode connected to the fourth node, a first capacitor including a first electrode which receives the first power supply voltage and a second electrode connected to the first node, and a light emitting element including an anode connected to the fourth node and a cathode which receives a second power supply voltage.

According to the pixel circuit, the display device including the pixel circuit, and the electronic device including the display device, the pixel circuit may provide a high PPI while having a relatively small area or footprint. The pixel circuit may compensate a threshold voltage of the first transistor, a dispersion of a mobility of the first transistor, and a threshold voltage of the third transistor. The pixel circuit may prevent an anode initialization issue due to a body effect from occurring. The pixel circuit may provide an increase in a data swing range may be increased. A feedback path formed in the pixel circuit may prevent a deterioration of the light emitting element.

BRIEF DESCRIPTION OF THE DRAWINGS

The above and other features of embodiments of the present disclosure will become more apparent by describing in detailed embodiments thereof with reference to the accompanying drawings, in which.

DETAILED DESCRIPTION

Figure 1:
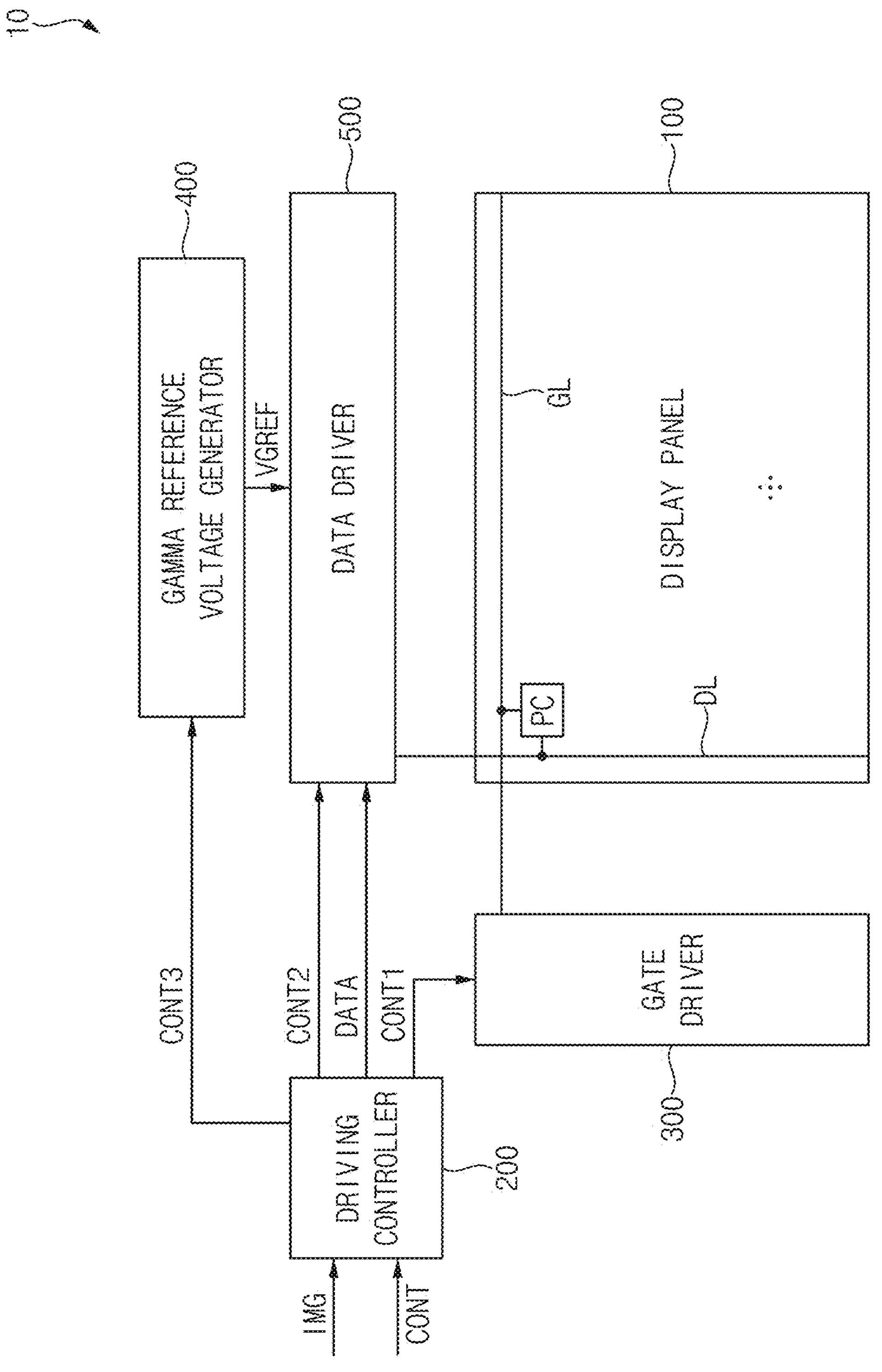
FIG. 1 is a block diagram illustrating a display device according to embodiments of the present disclosure.

Hereinafter, the present inventive concept will be described in more detail with reference to the accompanying drawings.

Embodiments supported by the present disclosure will now be described more fully hereinafter with reference to the accompanying drawings, in which one or more example embodiments are illustrated. Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The terms "high level" (or alternatively, "high voltage level") and "low level" (or alternatively, "low voltage level") are relative terms describing levels of voltages which, when applied to a transistor described herein, may activate a transistor (e.g., turn "ON" the transistor) or deactivate a transistor (e.g., turn "OFF" the transistor) based on transistor type (e.g., P-type, N-type, or the like).

FIG. 1 is a block diagram illustrating a display device 10 according to embodiments of the present disclosure.

Referring to FIG. 1, a display device 10 may include a display panel 100 and a display panel driver. The display panel driver may include a driving controller 200, a gate driver 300, a gamma reference voltage generator 400, and a data driver 500.

The display panel 100 may include a display area for displaying an image and a peripheral area arranged adjacent to the display area.

The display panel 100 may include gate lines GL, data lines DL, and pixel circuits PC electrically connected to the gate lines GL and the data lines DL, respectively. The gate lines GL may extend in a first direction, and the data lines DL may extend in a second direction crossing the first direction.

The driving controller 200 may receive input image data IMG and an input control signal CONT from an external device (not illustrated). For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be arranged in the driving controller 200 or may be arranged in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

Figure 2:
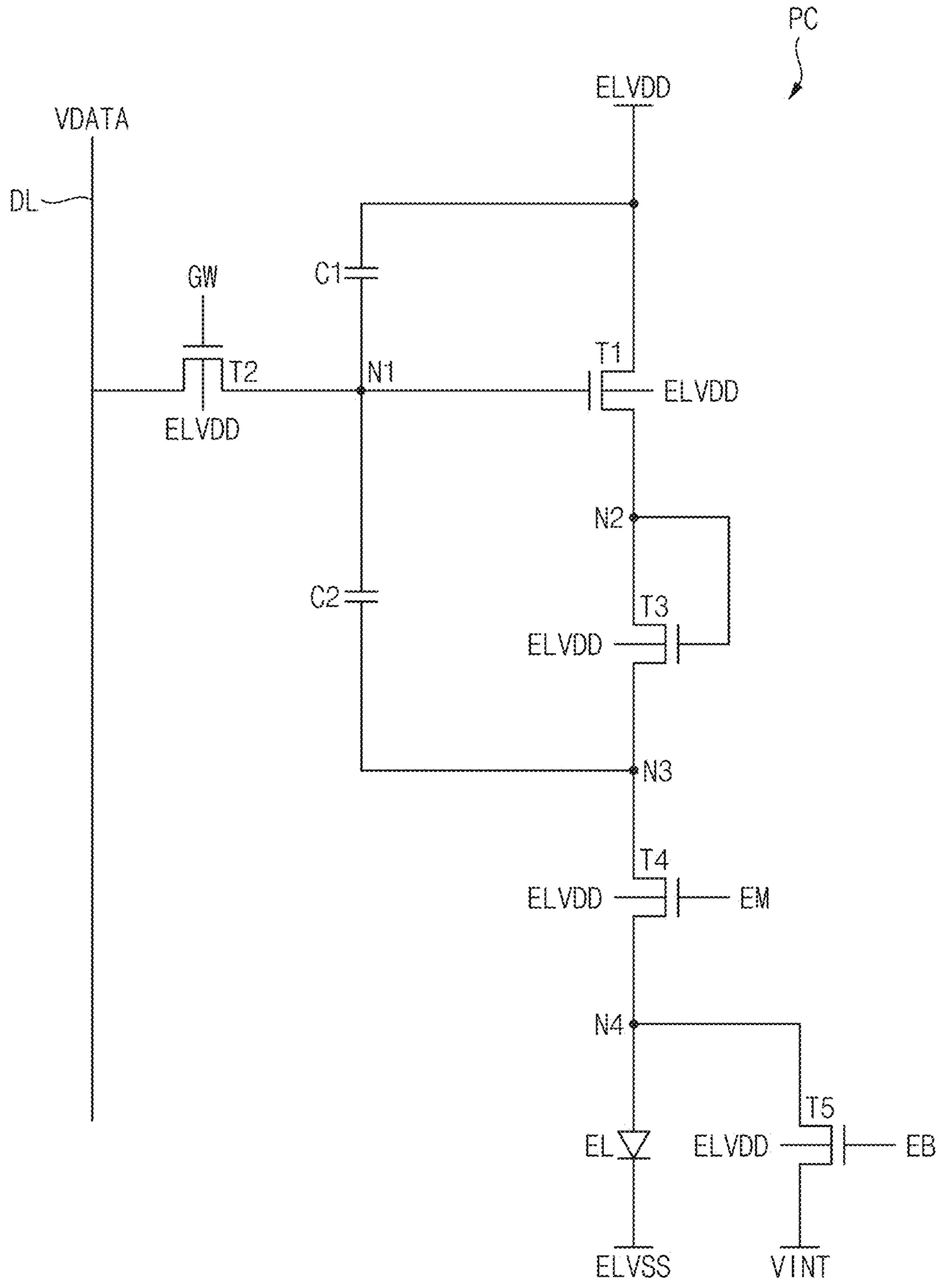
FIG. 2 is a circuit diagram illustrating an example of a pixel circuit of FIG. 1.
Figure 3:
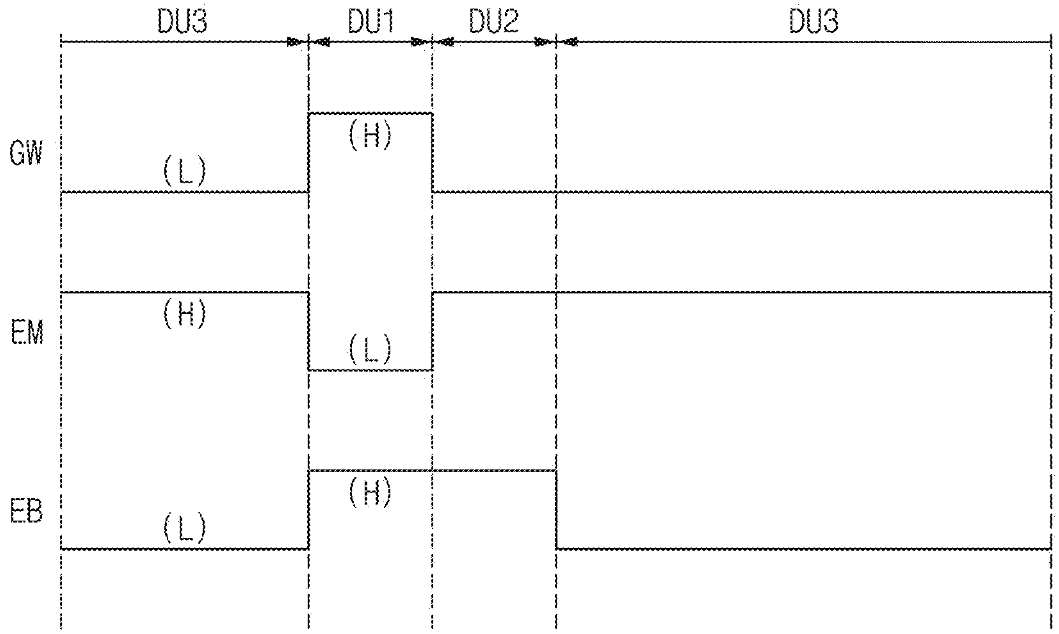
FIG. 3 is a timing diagram illustrating signals provided to a pixel circuit of FIG. 3.
Figure 4:
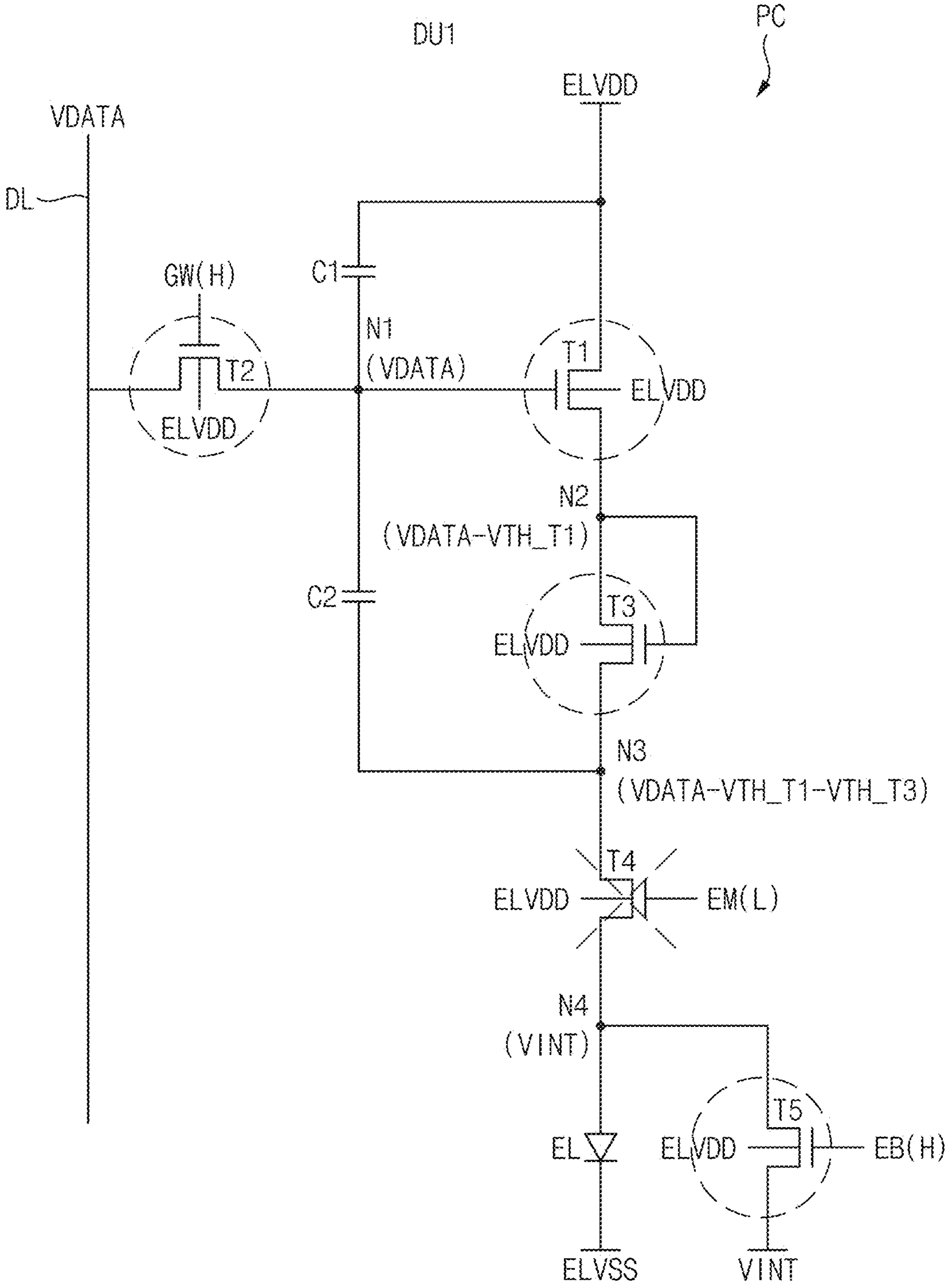
FIG. 4 is a circuit diagram illustrating an operation of a pixel circuit of FIG. 2 in a first duration of FIG. 3.
Figure 5:
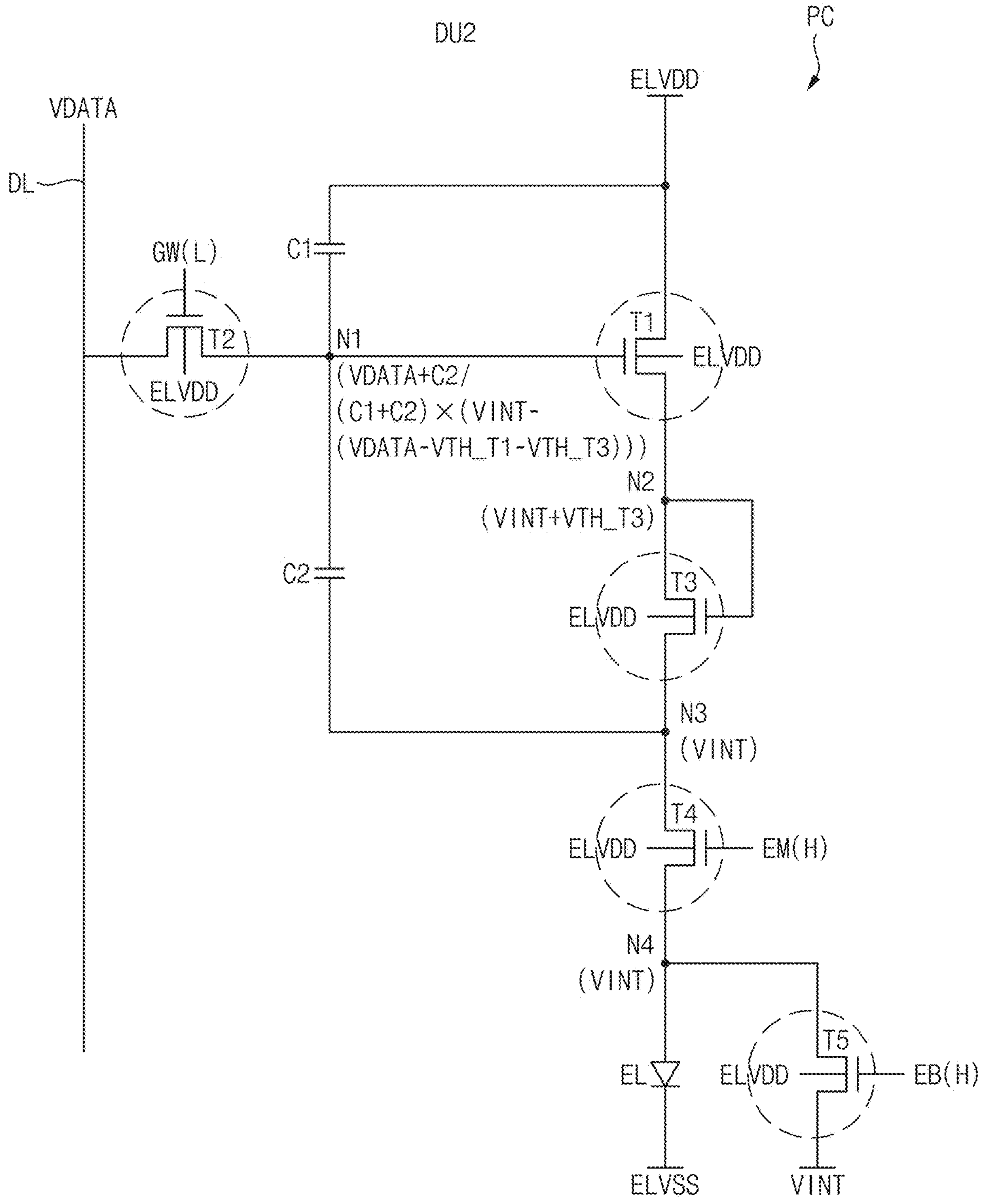
FIG. 5 is a circuit diagram illustrating an operation of a pixel circuit of FIG. 2 in a second duration of FIG. 3.
Figure 6:
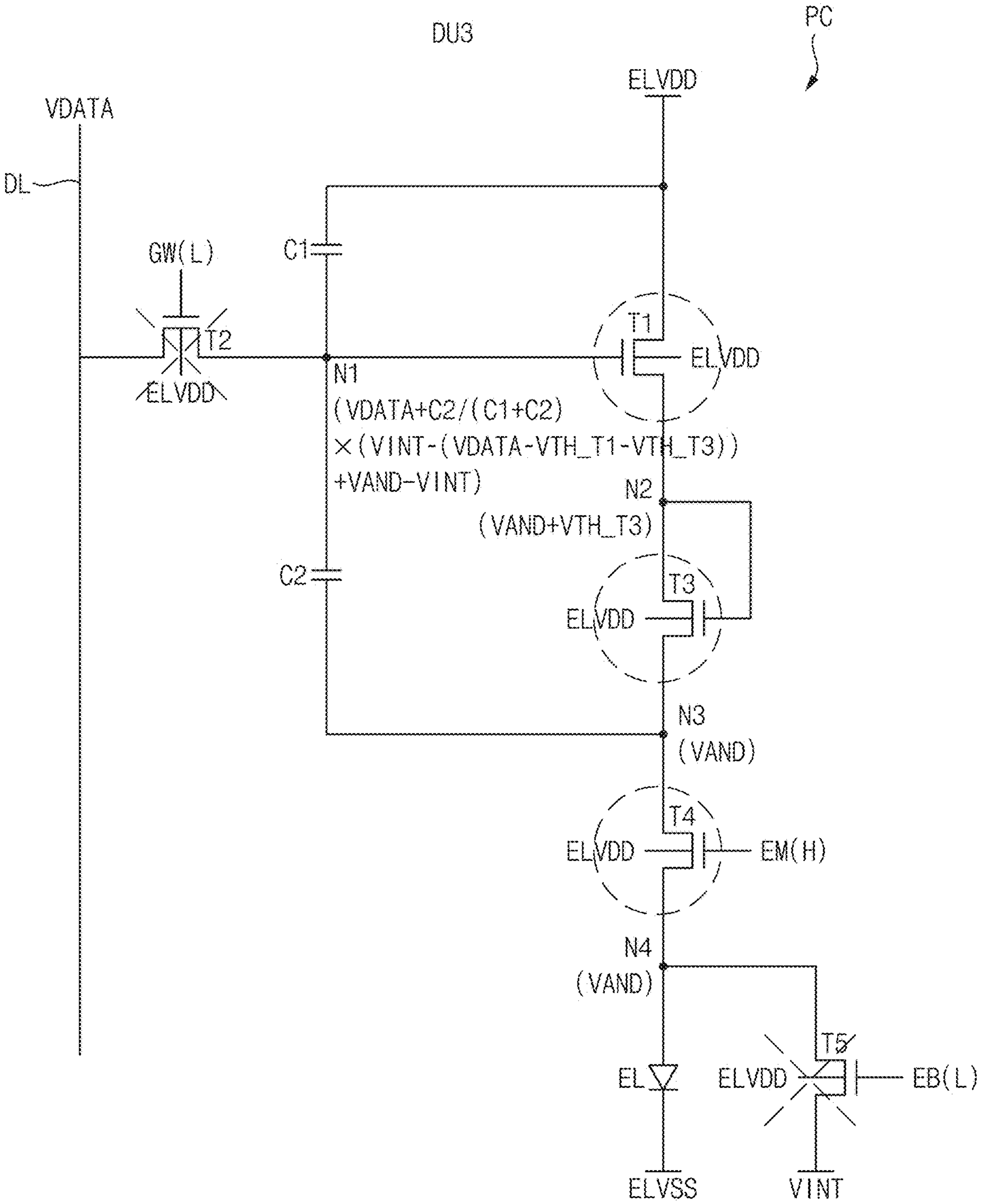
FIG. 6 is a circuit diagram illustrating an operation of a pixel circuit of FIG. 2 in a third duration of FIG. 3.

FIG. 2 is a circuit diagram illustrating an example of a pixel circuit PC of FIG. 1. FIG. 3 is a timing diagram illustrating signals GW, EM, EB provided to a pixel circuit PC of FIG. 3. FIG. 4 is a circuit diagram illustrating an operation of a pixel circuit PC of FIG. 2 in a first duration DU1 of FIG. 3. FIG. 5 is a circuit diagram illustrating an operation of a pixel circuit PC of FIG. 2 in a second duration DU2 of FIG. 3. FIG. 6 is a circuit diagram illustrating an operation of a pixel circuit PC of FIG. 2 in a third duration DU3 of FIG. 3. The durations described herein may also be referred to as time periods.

Referring to FIG. 2, a pixel circuit PC may include first to fifth transistors T1 to T5, a first capacitor C1, a second capacitor C2, and a light emitting element EL. In an embodiment, the first to fifth transistors T1 to T5 may be NMOS transistors. In an embodiment, the light emitting element EL may be a micro organic light emitting diode (Micro-OLED). In some aspects, since the pixel circuit PC includes five NMOS transistors and two capacitors, and NMOS transistors occupy a smaller area than PMOS transistors, the pixel circuit PC may provide a high PPI while having a relatively small area or footprint.

The first transistor T1 may include a gate electrode connected to a first node N1, a first electrode which receives a first power supply voltage ELVDD, and a second electrode connected to a second node N2. The first transistor T1 may generate a driving current based on a gate-source voltage of the first transistor T1. In an embodiment, the first transistor T1 may further include a body which receives the first power supply voltage ELVDD.

The second transistor T2 may include a gate electrode which receives a data write gate signal GW, a first electrode connected to a data line DL via which a data voltage VDATA is transmitted, and a second electrode connected to the first node N1. The second transistor T2 may turn on in response to the data write gate signal GW and provide the data voltage VDATA to the first node N1. In an embodiment, the second transistor T2 may further include a body which receives the first power supply voltage ELVDD.

The third transistor T3 may include a gate electrode connected to the second node N2, a first electrode connected to the second node N2, and a second electrode connected to a third node N3. That is, the third transistor T3 may be connected in a diode manner. Therefore, the third transistor T3 may be turned on during a driving of the pixel circuit PC. The third transistor T3 may function as a resistor as a diode, and the voltage at the third node N3 may be lower than the voltage at the second node N2. In an embodiment, the third transistor T3 may further include a body which receives the first power supply voltage ELVDD.

The fourth transistor T4 may include a gate electrode which receives an emission signal EM, a first electrode connected to the third node N3, and a second electrode connected to a fourth node N4. The fourth transistor T4 may turn on in response to the emission signal EM and connect the third node N3 and the fourth node N4. In an embodiment, the fourth transistor T4 may further include a body which receives the first power supply voltage ELVDD.

The fifth transistor T5 may include a gate electrode which receives an anode initialization gate signal EB, a first electrode which receives an initialization voltage VINT, and a second electrode connected to the fourth node N4. The fifth transistor T5 may turn on in response to the anode initialization gate signal EB and provide the initialization voltage VINT to the fourth node N4. In an embodiment, the fifth transistor T5 may further include a body which receives the first power supply voltage ELVDD.

The light emitting element EL may include an anode connected to the fourth node N4 and a cathode which receives a second power supply voltage ELVDD. The light emitting element EL may emit light based on the driving current.

For example, the first power supply voltage ELVDD may be 8 V, and the second power supply voltage ELVDD may be −2.5 V. For example, a high level H of each of the data write gate signal GW, the emission signal EM, and the anode initialization gate signal EB may be 8 V, and a low level L of each of the data write gate signal GW, the emission signal EM, and the anode initialization gate signal EB may be 0 V. For example, the initialization voltage VINT may be 0 V.

Referring to FIG. 3, a frame duration for the pixel circuit PC may include a first duration DU1, a second duration DU2, and a third duration DU3.

In the first duration DU1, the data write gate signal GW may have the high level H, the emission signal EM may have the low level L, and the anode initialization gate signal EB may have the high level H.

In the second duration DU2, the data write gate signal GW may have the low level L, the emission signal EM may have the high level H, and the anode initialization gate signal EB may have the high level H.

In the third duration DU3, the data write gate signal GW may have the low level L, the emission signal EM may have the high level H, and the anode initialization gate signal EB may have the low level L.

Referring to FIG. 4, in the first duration DU1, the first transistor T1, the second transistor T2, the third transistor T3, and the fifth transistor T5 may be turned on (i.e., transition to an ON state), and the fourth transistor T4 may be turned off (i.e., transition to an OFF state). The first duration DU1 may be a duration in which a threshold voltage of the first transistor T1 and a threshold voltage of the third transistor T3 are compensated and the anode is initialized.

The second transistor T2 may provide the data voltage VDATA to the first node N1, and the first transistor T1 may operate as a source follower. Therefore, the voltage at the first node N1 may be the data voltage VDATA, the voltage at the second node N2 may be "VDATA−VTH_T1", and the voltage at the third node N3 may be "VDATA−VTH_T1−VTH_T3". Here, VDATA may be the data voltage, VTH_T1 may be the threshold voltage of the first transistor T1, and VTH_T3 may be the threshold voltage of the third transistor T3. Therefore, the threshold voltage of the first transistor T1 and the threshold voltage of the third transistor T3 may be compensated.

The fifth transistor T5 may provide the initialization voltage VINT to the fourth node N4. Therefore, a voltage of the fourth node N4 (i.e., the anode) may be initialized to the initialization voltage VINT. In contrast, when the fifth transistor T5 is a PMOS transistor, an anode initialization issue due to a body effect may occur. For example, when the second power supply voltage ELVSS is 0 V, the voltage of the fourth node (i.e., the anode) may be 2.1 V, not 0 V. In contrast, when the fifth transistor T5 is the NMOS transistor in accordance with one or more embodiments of the present disclosure, the anode initialization issue due to the body effect may be prevented from occurring. For example, when the second power supply voltage ELVSS is 0 V, the voltage of the fourth node (i.e., the anode) may be 0 V.

Referring to FIG. 5, in the second duration DU2, the first transistor T1, the third transistor T3, the fourth transistor T4, and the fifth transistor T5 may be turned on, and the second transistor T2 may be turned off. The second duration DU2 may be an anode holding duration.

Since the second transistor T2 is turned off, the voltage at the second node N2 may be lowered. The fifth transistor T5 may provide the initialization voltage VINT to the fourth node N4. Therefore, a voltage of the anode may be held as the initialization voltage VINT, the voltage at the first node N1 may be "VDATA+C2/(C1+C2)×(VINT−(VDATA−VTH_T1−VTH_T3))", the voltage of the second node N2 may be "VINT+VTH_T3", and the voltage at the third node N3 may be the initialization voltage VINT.

Referring to FIG. 6, in the third duration DU3, the first transistor T1, the third transistor T3, and the fourth transistor T4 may be turned on, and the second transistor T2 and the fifth transistor T5 may be turned off. The third duration DU3 may be a an emission duration.

The first transistor T1 may generate the driving current based on the gate-source voltage of the first transistor T1. The light emitting element may emit light based on the driving current. The voltage at the first node N1 may be "VDATA+C2/(C1+C2)×(VINT−(VDATA−VTH_T1−VTH_T3))+VAND−VINT", the voltage at the second node N2 may be "VAND+VTH_T3", the voltage at the third node N3 may be the initialization voltage VINT, and the voltage of the fourth node N4 may be an anode voltage VAND. Here, VAND may be a voltage at the anode in the third duration DU3. A component of VDATA may be "C2/(C1+C2)×VDATA". Since "C2/(C1+C2)" is less than 1, a data swing range may be increased.

The light emitting element EL may deteriorate as the light emitting element EL emits the light. However, since the pixel circuit PC forms a feedback path, the deterioration of the light emitting element EL may be prevented. In an example in which the light emitting element EL emits the light, the anode voltage VAND may increase, the voltage at the third node N3 may increase, and the voltage at the first node N1 may increase. In this case, the gate-source voltage of the first transistor T1 may increase, such that an intensity of the driving current may increase. Accordingly, a voltage drop may increase, such that the voltage at the second node N2 may decrease, the voltage at the third node N3 may decrease, and the anode voltage VAND may decrease. In this case, a dispersion of a mobility of the first transistor T1 may also be compensated.

As such, the pixel circuit PC may provide the high PPI while having a relatively small area or footprint. The threshold voltage of the first transistor T1, the dispersion of the mobility of the first transistor T1, and the threshold voltage of the third transistor T3 may be compensated. The anode initialization issue due to the body effect may be prevented from occurring. The data swing range may be increased. As the feedback path is formed, the deterioration of the light emitting element EL may be prevented.

Figure 7:
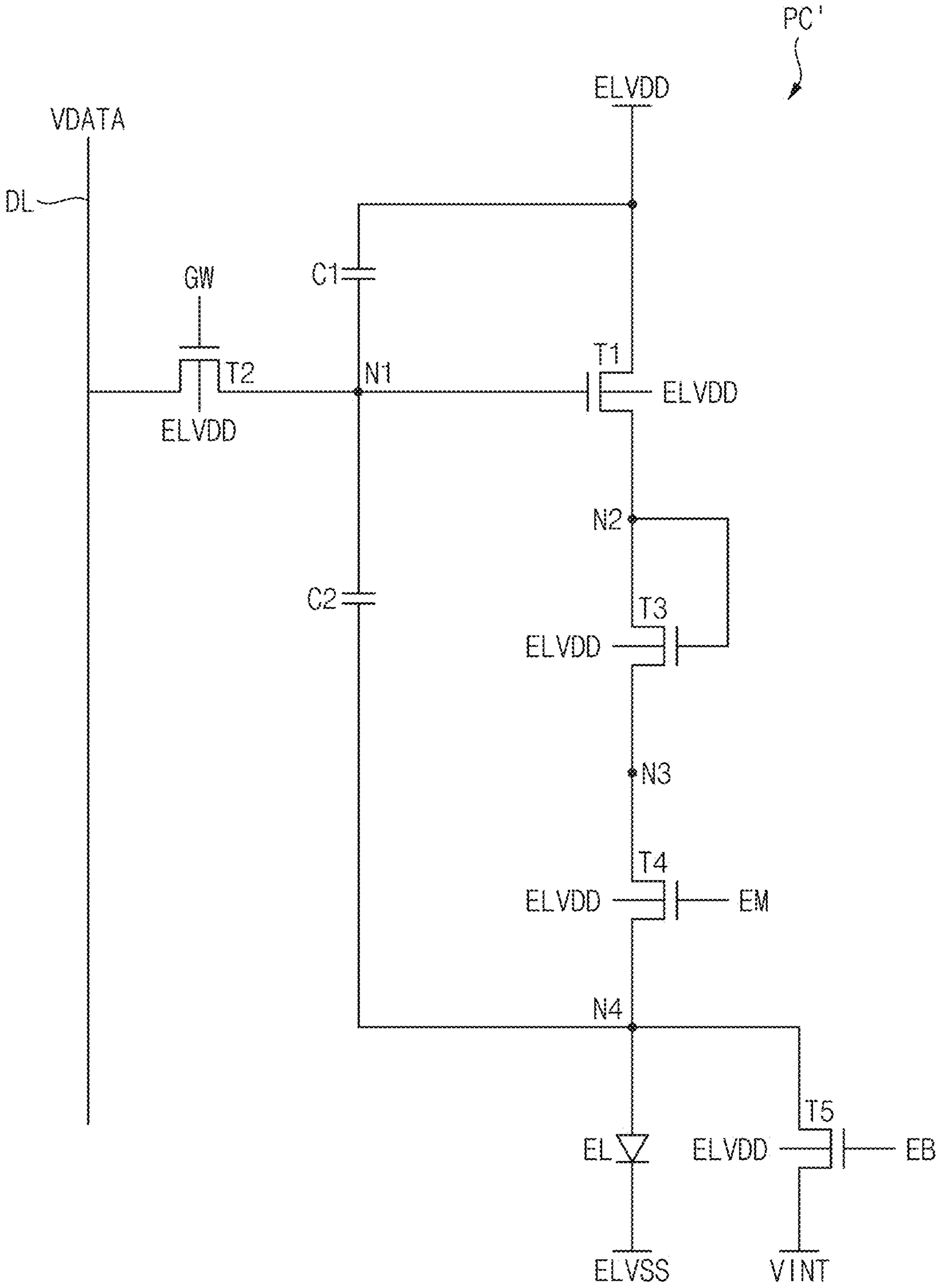
FIG. 7 is a circuit diagram illustrating an example of a pixel circuit of FIG. 1.

FIG. 7 is a circuit diagram illustrating an example of a pixel circuit PC of FIG. 1.

Referring to FIG. 2 and FIG. 7, a pixel circuit PC' of FIG. 7 may be substantially equal in configuration and operations as the pixel circuit PC of FIG. 2 except for a connection structure of the first capacitor C1 or the second capacitor C2. Therefore, redundant descriptions are omitted.

The pixel circuit PC' of FIG. 7 may include first to fifth transistors T1 to T5 and a second capacitor C2. The second capacitor C2 may include a first electrode connected to a first node N1 and a second electrode connected to a fourth node N4.

The pixel circuit PC' of FIG. 7 may further include a first capacitor C1. The first capacitor C1 may include a first electrode which receives a first power supply voltage ELVDD and a second electrode connected to the first node N1.

Figure 8:
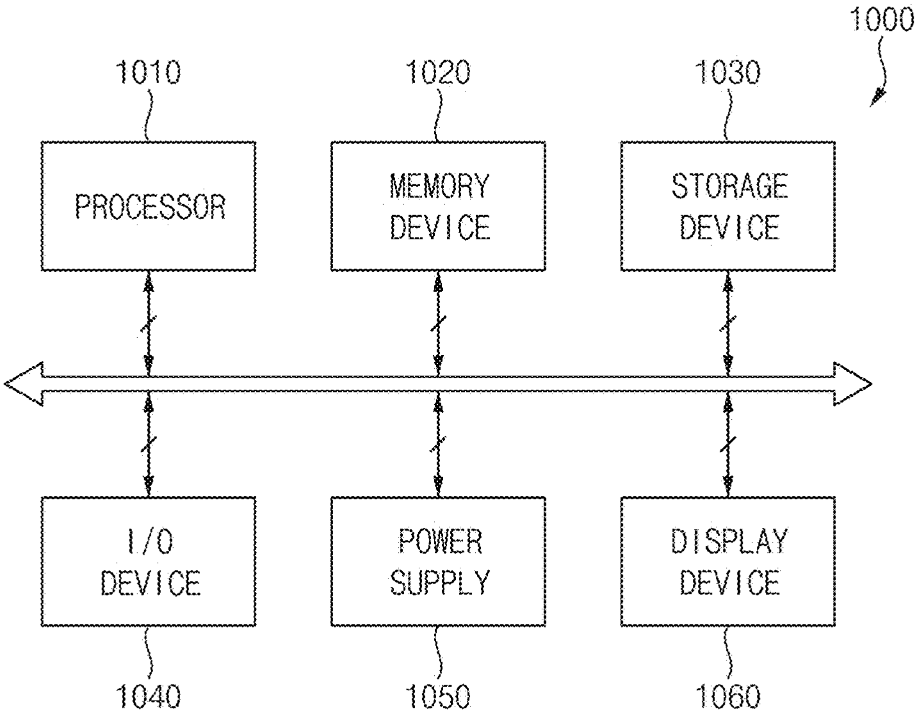
FIG. 8 is a block diagram illustrating an electronic device.
Figure 9:
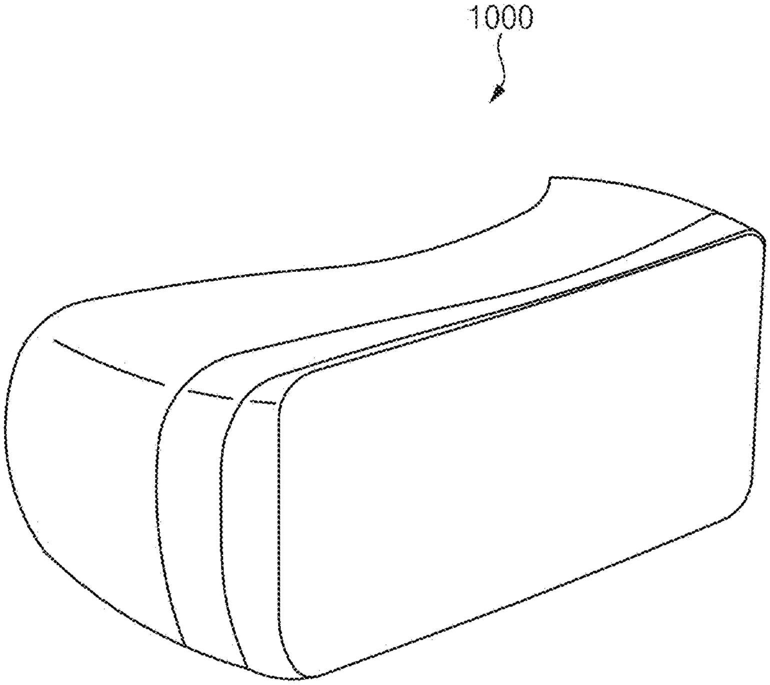
FIG. 9 is a diagram illustrating an embodiment in which an electronic device of FIG. 8 is implemented as a VR device.

FIG. 8 is a block diagram illustrating an electronic device 1000. FIG. 9 is a diagram illustrating an embodiment in which an electronic device 1000 of FIG. 8 is implemented as a VR device.

Referring to FIGS. 8 and 9, an electronic device 1000 may include a processor 1010, a memory device 1020, a storage device 1030, an input/output I/O device 1040, a power supply 1050, and a display device 1060. The display device 1060 may be the display device 10 of FIG. 1. In some aspects, the electronic device 1000 may further include a plurality of ports for communicating with a video card, a sound card, a memory card, a universal serial bus USB device, other electronic device, and the like.

In an embodiment, as illustrated in FIG. 9, the electronic device 1000 may be implemented as a VR device. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a microprocessor, a central processing unit CPU, an application processor AP, and the like. The processor 1010 may be coupled to other components via an address bus, a control bus, a data bus, and the like. Further, the processor 1010 may be coupled to an extended bus such as, for example, a peripheral component interconnection PCI bus.

The memory device 1020 may store data for operations of the electronic device 1000. For example, the memory device 1020 may include at least one nonvolatile memory device such as, for example, an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as, for example, a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as, for example, a keyboard, a keypad, a mouse device, a touch-pad, a touch-screen, and the like, and an output device such as, for example, a printer, a speaker, and the like. In some embodiments, the I/O device 1040 may include the display device 1060.

The power supply 1050 may provide power for operations of the electronic device 1000.

The display device 1060 may be connected to other components through buses or other communication links.

Aspects of the embodiments described herein may be applied to any display device and any electronic device including the touch panel. For example, aspects of the embodiments described herein may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, or the like.

The foregoing is illustrative of the inventive concept and is not to be construed as limiting thereof. Although example embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A pixel circuit comprising:

a first transistor comprising a gate electrode connected to a first node, a first electrode which receives a first power supply voltage, and a second electrode connected to a second node;

a second transistor comprising a gate electrode which receives a data write gate signal, a first electrode connected to a data line via which a data voltage is transmitted, and a second electrode connected to the first node;

a third transistor comprising a gate electrode connected to the second node, a first electrode connected to the second node, and a second electrode connected to a third node;

a fourth transistor comprising a gate electrode which receives an emission signal, a first electrode connected to the third node, and a second electrode connected to a fourth node;

a fifth transistor comprising a gate electrode which receives an anode initialization gate signal, a first electrode which receives an initialization voltage, and a second electrode connected to the fourth node;

a first capacitor comprising a first electrode which receives the first power supply voltage and a second electrode connected to the first node; and a light emitting element comprising an anode connected to the fourth node and a cathode which receives a second power supply voltage.

2. The pixel circuit of claim 1, further comprising:

a second capacitor comprising a first electrode connected to the first node and a second electrode connected to the third node.

3. The pixel circuit of claim 1, further comprising:

a second capacitor comprising a first electrode connected to the first node and a second electrode connected to the fourth node.

4. The pixel circuit of claim 1, wherein the first transistor, the second transistor, the third transistor, the fourth transistor, and the fifth transistor are NMOS transistors.

5. The pixel circuit of claim 1, wherein, in a first duration, the data write gate signal has a high level, the emission signal has a low level, and the anode initialization gate signal has the high level.

6. The pixel circuit of claim 5, wherein, in the first duration, the first transistor, the second transistor, the third transistor, and the fifth transistor are turned on, and the fourth transistor is turned off.

7. The pixel circuit of claim 5, wherein, in a second duration after the first duration, the data write gate signal has the low level, the emission signal has the high level, and the anode initialization gate signal has the high level.

8. The pixel circuit of claim 7, wherein, in the second duration, the first transistor, the third transistor, the fourth transistor, and the fifth transistor are turned on, and the second transistor is turned off.

9. The pixel circuit of claim 7, wherein, in a third duration after the second duration, the data write gate signal has the low level, the emission signal has the high level, and the anode initialization gate signal has the low level.

10. The pixel circuit of claim 9, wherein, in the third duration, the first transistor, the third transistor, and the fourth transistor are turned on, and the second transistor and the fifth transistor are turned off.

11. A display device comprising:

a display panel comprising a pixel circuit;

a data driver which provides a data voltage to the pixel circuit;

a gate driver which provides a gate signal to the pixel circuit; and a driving controller which controls the data driver and the gate driver, wherein the pixel circuit comprises:

a first transistor comprising a gate electrode connected to a first node, a first electrode which receives a first power supply voltage, and a second electrode connected to a second node;

a second transistor comprising a gate electrode which receives a data write gate signal, a first electrode connected to a data line via which a data voltage is transmitted, and a second electrode connected to the first node;

a third transistor comprising a gate electrode connected to the second node, a first electrode connected to the second node, and a second electrode connected to a third node;

a fourth transistor comprising a gate electrode which receives an emission signal, a first electrode connected to the third node, and a second electrode connected to a fourth node;

a fifth transistor comprising a gate electrode which receives an anode initialization gate signal, a first electrode which receives an initialization voltage, and a second electrode connected to the fourth node;

a first capacitor comprising a first electrode which receives the first power supply voltage and a second electrode connected to the first node; and a light emitting element comprising an anode connected to the fourth node and a cathode which receives a second power supply voltage.

12. The display device of claim 11, wherein the pixel circuit comprises:

a second capacitor comprising a first electrode connected to the first node and a second electrode connected to the third node.

13. The display device of claim 11, wherein the pixel circuit comprises:

a second capacitor comprising a first electrode connected to the first node and a second electrode connected to the fourth node.

14. The display device of claim 11, wherein the first transistor, the second transistor, the third transistor, the fourth transistor, and the fifth transistor are NMOS transistors.

15. The display device of claim 11, wherein, in a first duration, the data write gate signal has a high level, the emission signal has a low level, and the anode initialization gate signal has the high level.

16. The display device of claim 15, wherein, in the first duration, the first transistor, the second transistor, the third transistor, and the fifth transistor are turned on, and the fourth transistor is turned off.

17. The display device of claim 15, wherein, in a second duration after the first duration, the data write gate signal has the low level, the emission signal has the high level, and the anode initialization gate signal has the high level.

18. The display device of claim 17, wherein, in the second duration, the first transistor, the third transistor, the fourth transistor, and the fifth transistor are turned on, and the second transistor is turned off.

19. The display device of claim 17, wherein, in a third duration after the second duration, the data write gate signal has the low level, the emission signal has the high level, and the anode initialization gate signal has the low level.

20. An electronic device comprising:

a display panel comprising a pixel circuit;

a data driver which provides a data voltage to the pixel circuit;

a gate driver which provides a gate signal to the pixel circuit;

a driving controller which controls the data driver and the gate driver; and a processor which controls the driving controller, wherein the pixel circuit comprises:

a first transistor comprising a gate electrode connected to a first node, a first electrode which receives a first power supply voltage, and a second electrode connected to a second node;

a second transistor comprising a gate electrode which receives a data write gate signal, a first electrode connected to a data line via which a data voltage is transmitted, and a second electrode connected to the first node;

a third transistor comprising a gate electrode connected to the second node, a first electrode connected to the second node, and a second electrode connected to a third node;

a fourth transistor comprising a gate electrode which receives an emission signal, a first electrode connected to the third node, and a second electrode connected to a fourth node;

a fifth transistor comprising a gate electrode which receives an anode initialization gate signal, a first electrode which receives an initialization voltage, and a second electrode connected to the fourth node;

a first capacitor comprising a first electrode which receives the first power supply voltage and a second electrode connected to the first node; and a light emitting element comprising an anode connected to the fourth node and a cathode which receives a second power supply voltage.

* * * * *